United States Patent [19]

Aoyagi et al.

[11] Patent Number: 5,635,574
[45] Date of Patent: Jun. 3, 1997

[54] MICROSPHERE AND METHOD FOR PRODUCTION THEREOF

[75] Inventors: Juuro Aoyagi; Toyoaki Suzuki, both of Tokyo; Reiko Kato, Kanagawa; Masanori Nagata, Tokyo, all of Japan

[73] Assignee: Fujimoro Kogyo Co., Ltd., Tokyo, Japan

[21] Appl. No.: 617,979

[22] Filed: Mar. 15, 1996

Related U.S. Application Data

[63] Continuation of Ser. No. 360,206, Dec. 20, 1994, abandoned.

[30] Foreign Application Priority Data

Dec. 22, 1993 [JP] Japan .................................. 5-325181

[51] Int. Cl.$^6$ .................. C08F 226/02; C08F 222/38
[52] U.S. Cl. .................. 526/212; 526/78; 526/80; 526/81; 526/86; 526/210; 526/218.1; 526/227; 526/303.1; 526/304; 526/307.2; 526/307.3; 526/307.4

[56] References Cited

U.S. PATENT DOCUMENTS

| | | | |
|---|---|---|---|
| 2,504,074 | 10/1950 | Jones | 526/307.2 |
| 4,425,469 | 1/1984 | Emmons | 524/750 |
| 4,897,306 | 1/1990 | Sugimoto | 428/336 |
| 5,077,058 | 12/1991 | Lapoiriere et al. | |
| 5,389,722 | 2/1995 | Nagasuna | 525/55 |

FOREIGN PATENT DOCUMENTS

| | | |
|---|---|---|
| 0403395 | 6/1989 | European Pat. Off. . |
| 63-90521 | 4/1988 | Japan . |
| 163663 | 6/1989 | Japan . |
| 4279604 | 10/1992 | Japan . |
| 4279605 | 10/1992 | Japan . |

OTHER PUBLICATIONS

"Hyrogel Microspheres II, Precipitation Copolymerization of Acrylamide with Comonomers to Prepare Monodisperse Hydrogel Microspheres" by Haruma Kawaguchi, Yukino Yamada, Shinobu Kataoka, Yasuhiro Morita and Yasuji Ohtsuka, Polymer Journal, vol. 23, No. 8, pp. 955–962 (1991).

*Primary Examiner*—Fred Zitomer
*Attorney, Agent, or Firm*—Mathews, Woodbridge & Collins

[57] ABSTRACT

A method for the production of a microsphere without use of a dispersion stabilizer is disclosed which permits the microsphere to be produced in the form of discrete particles readily treatable for purification. The method which produces this microsphere comprises the steps of dissolving in an organic solvent such as an alcohol a monomer mixture including an ethylenically unsaturated amide and 10 to 70% by weight, based on 100% by weight of said monomer mixture, of a cross-linking agent thereby preparing a mixed solution, keeping said mixed solution at a temperature in the range of from 30° to 95° C., and adding thereto at least one initiator selected from the group consisting of peroxide type initiators and azo type initiators in an amount such as to be contained therein at a final concentration in the range of from $1\times10^{-5}$ to $8\times10^{-2}$ mol/liter thereby inducing polymerization of said monomer mixture. The microsphere consequently obtained can be used as one kind of a substrate most suitable for the preparation of an affinity adsorbent serving ideally as a filler for use in affinity chromatography.

18 Claims, No Drawings

MICROSPHERE AND METHOD FOR PRODUCTION THEREOF

This application is a continuation of application Ser. No. 08/360,206, filed Dec. 20, 1994, now abandoned.

FIELD OF THE INVENTION

1. Field of the Invention

This invention relates to a novel microsphere and a method for the production thereof.

2. Description of the Prior Art

The affinity chromatography is now an indispensable tool for persons who engage in works pertinent to organisms in various fields ranging from basic through applied branches of science. The dissertation presented by Cuatrecases et al. [Proc. Natl. Acad. Sci. U.S., 61, 636–643 (1968)] may well be credited with fully familiarizing these persons to this method of analysis. Before the publication of this dissertation prevailed the idea of preparing an affinity adsorbent as a filler for use in affinity chromatography by fixing a ligand having affinity for a substance under test fast with a chemical bond on a substrate. This idea was not materialized until the use of plastic beads as a substrate was abandoned as unfit. The causes which used to obstruct the dissemination of affinity chromatography have been removed by adopting agarose gel beads as a substrate, also using a method of cyanogen bromide activation for the fixation of a ligand, and further, in the fixation of a ligand of low molecular weight on a substrate, inserting a spacer between the ligand and the substrate.

The affinity chromatography has since disseminated rapidly and, in consequence of the dissemination, numerous researches have been launched in search of an optimum substrate for the preparation of an ideal affinity adsorbent. It is generally held that the substrate is expected to fulfill such requirements as exhibiting hydrophilicity and chemical inactivity, possessing an activable functional group, abounding in physical and chemical stability, assuming the form of gel beads of a sturdy and porous structure, and featuring uniformity of size and toughness of the gel beads.

Various kinds of substrates have been developed to date. Since no one substrate can meet all the conceivable purposes of analysis, various substrates such as cellulose, cross-linked dextran, agarose gel, polyacrylamide gel, porous glass, polyhydroxy methacrylate gel, the gel produced by polymerizing a hydrophilic vinyl monomer, and the copolymer of agarose gel with polyacrylamide which are adapted for various purposes of analysis are being developed.

The polyacrylamide gel is at an advantage in being so inactive biologically as to defy microorganic decomposition and retaining stability in solutions of various salts, surfactants, and guanidine hydrochloride normally used in affinity chromatography so long as the pH value of solution is in the range of from 2 to 10.

Further, the polyacrylamide gel is capable of fixing a ligand at a very high concentration on the basis of the amide group which is copiously present in the gel. Theoretically, it ought to permit formation of an adsorbent of extremely high capacity for adsorption.

With respect to this method for the production of this polyacrylamide gel, since the aqueous solution polymerization produces a highly viscous solution which is difficult to handle or purify, the method for producing the gel by precipitation polymerizing acrylamide in an alcohol is generally adopted.

The primary particles which are obtained by precipitation polymerization undergo secondary aggregation and finally assume the form of coarse porous particles each forming an aggregate of a multiplicity of primary particles. Though these coarse particles enjoy the advantage of very easy handling, they are not disintegrable into individual discrete particles and have large and ununiform sizes.

As a method for enabling the precipitation of acryl amide in an alcohol to produce discrete particles without entailing secondary aggregation of the primary particles, it has been reported that the addition of a suitable amount of methacrylic acid to the polymerization system permits production of discrete submicrons [H. Kawaguchi, et al., Polym. J., 23 (8), 955–962 (1991)]. Similarly, JP-A-63-90,521 discloses that polymer particles are obtained by the addition of an ethylenically unsaturated carboxylic acid monomer containing methacrylic acid without particularly requiring use of a dispersing agent. The report mentioned above further has a remark to the effect that, in the polymerization system with methacrylic acid, the number of particles is fixed during the initial stage of polymerization, the particles grow thereafter at a uniform pace, and the diameters of these particles can be controlled by the methacrylic acid/acrylamide ratio to a level exceeding a micron.

In the system mentioned in the report as described above, the formation of discrete particles is attained because the polymer containing methacrylic acid in a large amount plays the role of a dispersion stabilizing polymer. The use of such a dispersion stabilizing polymer as this is also proposed in JP-A-04-279,604 and JP-A-04-279,605.

Since the dispersion stabilizer (dispersion stabilizing polymer) is used as an essential component, however, this dispersion stabilizer is either coprecipitated with the formed polymer or dispersed in the reaction solution together with the formed polymer. In order for the produced polymer to be used advantageously in the field of affinity chromatography which must avoid defilement by impurities to the utmost, it is important that the produced polymer be given a treatment for purification. The presence of the dispersion stabilizer (dispersion stabilizing polymer), however, presents the problem of complicating this treatment for purification.

Heretofore, in the use of the polyacryl amide gel as in affinity chromatography, for the purpose of fixing a ligand at an extremely high concentration by utilizing the amide richly present in the gel, the practice of producing gel beads having a porous structure and causing the functional group in the gel to be bound with a spacer or the ligand has been followed.

When the gel beads are formed in a porous structure, however, they do not acquire ample mechanical strength and suffer their porous structure to be broken under the impact liable to be inflicted thereon while they are in use. When the mechanical strength of these gel beads is exalted by increasing the degree of polymerization through adjustment with a cross-linking agent, the pores contained in the gel beads of the porous structure are caused to decrease their diameters. While these gel beads permit fixation of a low molecular ligand or a spacer, they block entry of such substance as glycoprotein for which the ligand manifests affinity. Theoretically, the gel beads ought to form an adsorbent having a very high capacity for adsorption. Actually, however, they do not acquire any fully satisfactory quality as an affinity adsorbent.

An object of this invention, therefore, is to provide a novel microsphere and a method for the production thereof.

Another object of this invention is to provide a microsphere containing at a high concentration a functional group effective in adapting the polymer for an adsorbent which excels in mechanical strength, chemical stability, and ability to effect efficient adsorption in a wide pH range.

Yet another object of this invention is to provide a method for the production of a microsphere possessing the characteristics mentioned above and containing no impurities and, therefore, obviating the necessity for using a dispersion stabilizer in the process of production and permitting easy treatment for purification after the step of polymerization.

SUMMARY OF THE INVENTION

The present inventors, for the purpose of attaining the objects mentioned above, have made a diligent study in search of a novel microsphere and a method for the production thereof. It has consequently been ascertained that the desire to obtain a microsphere possessing such high mechanical strength has never been attained in the conventional polyacrylamide gel beads. A microsphere and containing at a high concentration a functional group effective in adapting the polymer for an adsorbent of high capacity for adsorption is satisfied by producing the polymer in a finely divided and dispersed state such as to enlarge the surface area of the produced microfine gel and increase the number of functional groups (amide groups) on the surface of the gel beads and permit utilization of the functional groups on the surface of the gel beads instead of the functional groups in the pores of the gel beads. Further, in the precipitation polymerization of a monomer mixture including an ethylenically unsaturated amide in an organic solvent such as, for example, an alcohol, preferably in a mixed solvent comprising of water and an organic solvent such as an alcohol as a means of obtaining the polymer in such a finely divided and dispersed state as mentioned above, the primary particles which are capable of avoiding secondary aggregation are obtained only when the amount of a cross-linking agent, the kind of a solvent, the concentration of an initiator, and the temperature of polymerization are simultaneously confined within extremely limited ranges. Thus, the present invention relates to have a microsphere that can be produced in the form of discrete particles without requiring use of a dispersion stabilizer (dispersion stabilizing polymer) and the produced polymer can be easily treated for purification. This invention has been perfected based on this knowledge.

One object of this invention is accomplished by (1) a method for the production of a microsphere having the steps of dissolving in an organic solvent such as an alcohol a monomer mixture including an ethylenically unsaturated amide and 10 to 70% by weight, based on 100% by weight of the monomer mixture including an ethylenically unsaturated amide and the cross-linking agent, of a cross-linking agent thereby preparing a mixed solution, keeping the mixed solution at a temperature in the range of from 30° to 95° C., and adding thereto at least one initiator selected from the group consisting of peroxide type initiators and azo type initiators in an amount such as to be contained therein at a final concentration in the range of from $1 \times 10^{-5}$ to $8 \times 10^{-2}$ mol/liter thereby inducing polymerization of the monomer mixture.

Another object of this invention is accomplished by (2) a method according to the item (1), wherein the polymerization is carried out without addition of a dispersant.

Another object of this invention is accomplished by (3) a method according to the item (2), wherein water is added to the organic solvent in an amount of not more than 30% by weight based on 100% by weight of the whole amount of the solvent.

Another object of this invention is accomplished by (4) a method according to the item (3), wherein the amount of water is in the range of from 10 to 25% by weight based on 100% by weight of the total amount of the solvent.

Another object of this invention is accomplished by (5) a method according to the item (1), wherein the ethylenically unsaturated amide is at least one member selected from the group consisting of acrylamide, methacrylamide, diacetone acrylamide, and N-hydroxymethyl acrylamide.

Another object of this invention is accomplished by (6) a method according to the item (5), wherein the ethylenically unsaturated amide is acrylamide.

Another object of this invention is accomplished by (7) a method according to the item (1), wherein the monomer mixture including an ethylenically unsaturated amide includes a monomer possessing at least one group selected from the class consisting of —OH group, —NH$_2$ group, and —SH group.

Another object of this invention is accomplished by (8) a method according to the item (7), wherein the content of the ethylenically unsaturated amide monomer in the monomer mixture including an ethylenically unsaturated amide is not more than 0.1 mol%.

Another object of this invention is accomplished by (9) a method according to the item (1), wherein the amount of the monomer mixture to be added is in the range of from 0.1 to 70% by weight, based on the amount of the organic solvent.

Another object of this invention is accomplished by (10) a method according to the item (1), wherein the cross-linking agent is a compound having at least two unsaturated double bonds in the molecular unit thereof.

Another object of this invention is accomplished by (11) a method according to the item (1), wherein the amount of the cross-linking agent to be added is in the range of from 15 to 60% by weight based on 100% by weight of the monomer mixture including the ethylenically unsaturated amide and the cross-linking agent.

Another object of this invention is accomplished by (12) a method according to the item (1), wherein the concentration of the initiator is in the range of from $0.5 \times 10^{-4}$ to $5 \times 10^{-2}$ mol/liter of the mixed solution.

Another object of this invention is accomplished by (13) a method according to the item (1), wherein the polymerization temperature is in the range of from 65° to 85° C.

Another object of this invention is accomplished by (14) a microsphere produced by the method according to any of the items (1) to (13) and characterized by possessing a hygroscopic coefficient in the range of from 10 to 400% and a gelling ratio in the ratio of from 40 to 98%.

Another object of this invention is accomplished by (15) a microsphere according to the item (14), wherein the microsphere has a particle diameter in the range of from 0.05 to 0.5 µm.

Another object of this invention is accomplished by (16) a microsphere according to the item (14), wherein the hygroscopic coefficient is in the range of from 50 to 300%.

Another object of this invention is accomplished by (17) a microsphere according to the item (15), wherein the microsphere has a particle diameter in the range of from 0.08 to 0.4 µm.

Another object of this invention is accomplished by (18) a microsphere according to the item (15), wherein the gelling ratio is in the range of from 50 to 90%.

This invention is capable of manufacturing discrete polymer beads without requiring use of a dispersion stabilizer or a dispersion stabilizing polymer. The microsphere thus produced can be easily treated for purification and contains impurities very sparingly. The produced microsphere, therefore, can be utilized as a polyacrylamide gel, i.e. one type of optimum substrate for the formation of an affinity adsorbent ideally used as a filler in affinity chromatography. Further, since it is in the form of physically and chemically stable, sparse, and strong gel beads of a porous structure which manifest hydrophilicity and chemical inactivity and possess an activable functional group and further since these gel beads are discrete and strong particles of a uniform size, the microsphere can be used fully satisfactorily as materials for cosmetic articles and for diagnostic reagents.

DESCRIPTION OF THE PREFERRED EMBODIMENT

Now, this invention will be explained more specifically below with reference to embodiments.

The alcohols which are usable effectively for the production of a microsphere by the method of this invention include monohydric alcohols such as methanol, ethanol, propanol, isopropanol, 1-butanol, 2-butanol, t-butyl alcohol, 1-pentanol, 2-pentanol, 3-pentanol, t-pentyl alcohol, 1-hexanol, 2-hexanol, and 3-hexanol, dihydric alcohols such as ethylene glycol, diethylene glycol, triethylene glycol, propylene glycol, dipropylene glycol, 1,3-butylene glycol, neo-pentyl glycol, pentamethylene glycol, and hexamethylene glycol, trihydric alcohols such as glycerol, alcohols of one to six carbon atoms such as ethylene glycol monomethyl ether, ethylene glycol monoethyl ether, ethylene glycol monobutyl ether, and ethylene glycol monoisobutyl ether, and various grades of polyethylene glycol having molecular weights of not more than 6000 and not less than 4000, for example. These organic solvents may be used either singly or in the form of mixtures of two or more members. Desirably, in the present invention, water is added, when necessary, to the alcohol as the organic solvent generally in an amount of not more than 30% by weight, preferably in the range of from 10 to 25% by weight, and more preferably from 15 to 20% by weight, based on 100% by weight of the whole solvent (the term "whole solvent" referring to the alcohol as an organic solvent plus water). If the amount of water thus added exceeds 30% by weight, the excess of water will cause the produced gel beads to agglomerate will bring about an increase in the diameter of the gel beads. When this amount is in the range mentioned above, the gel beads are produced by precipitation polymerization in as thoroughly a dispersed state in a solvent as are obtained by dispersion polymerization without requiring use of a dispersion stabilizer in the process of polymerization. Thus, the water added in this amount is beneficial to the formation of a dispersible microsphere.

Then, the ethylenically unsaturated amide monomers which are effectively usable for the production of the microsphere by the method of this invention include acryl amide, methacryl amide, diacetone acrylamide, and N-hydroxymethyl acrylamide, for example. These monomers may be used either singly or in the form of a combination of two or more members. Among other monomers cited above, acrylamide proves to be particularly desirable.

The monomer mixture including an ethylenically unsaturated amide monomer is only required to be the combination of such an ethylenically unsaturated amide monomer as mentioned above with another monomer which is copolymerizable thereof. Since the produced microsphere is preferable to be rendered adjustable by the functional group on the surface thereof so as to permit selection of a ligand to be fixed on the microsphere, the other copolymerizable monomer mentioned above is preferable to be a monomer possessing at least one group selected from the class consisting of —OH group, —$NH_2$ group, and —SH group. These other copolymerizable monomers may be used either singly or in the form of a combination of two or more members.

The content of the ethylenically unsaturated amide monomer in the monomer mixture mentioned above is generally not less than 0.1 mol %, preferably not less than 0.3 mol %, and more preferably not less than 0.5 mol %. If this content is less than 0.1 mol %, the produced polymer will not acquire a fully satisfactory particulate form.

The amount of the monomer mixture to be added to the organic solvent mentioned above is generally in the range of from 0.1 to 70% by weight, preferably from 1 to 25% by weight, and more preferably from 2 to 10% by weight, based on the amount of the organic solvent. If the amount of the amide monomer to be used in the mixed solution is less than 0.1% by weight, the velocity of polymerization reaction will be unduly low and the produced microsphere will acquire no satisfactory quality because of an extremely low monomer concentration in the mixed solution. Conversely, if this amount exceeds 70% by weight, the usability of the produced polymer as a filler in affinity chromatography is questionable because the polymer beads have an unduly large diameter and are susceptible of secondary aggregation. Since a proteinaceous substance having a low speed of diffusion is at an advantage in easily diffusing and describing a sharp solute band, the beads which are to be used as a filler for affinity chromatography are desired to be amply minute globular particles having a uniform diameter.

Now, the cross-linking agent which can be used in this invention is a compound possessing at least two unsaturated double bonds in the molecular unit thereof. As typical examples of the cross-linking agent, alkylene bis-acrylamides such as N,N'-methylene bis-acryl amide, ethylene bis-acryl amide, and piperodine acrylamide, alkylene di(meth)acrylates such as ethylene di(meth)acrylate, di(meth)acrylates of various bisphenol A derivatives as ethylene glycol di(meth)acrylate, polyethylene glycol di(meth)acrylate, and bisphenol A di(meth)acrylate, di-, tri-, or tetra-(meth)acrylic acid esters of polyhydric alcohols such as glycerol and pentaerythritol, di- or tri-(meth)acrylates of ethylene oxide-modified phosphoric acids, di- or tri-(meth)acrylic acid esters of oligoester (meth)-acrylates, polyester (meth)acrylates, urethane acrylate, isocyanurate, or derivatives thereof, N-alkoxy methyl (meth)-acryl amide derivatives such as vinyl (meth)acrylate, acryl (meth)acrylate, poly-N-methylol acryl amide, N-methylol acrylamide, trimethylol propane trimethacrylate, N-methylol (meth) acrylamide, N-methoxymethyl acrylamide, N-ethoxymethyl acrylamide, N-n-butoxymethyl acrylamide, N-n-butoxymethyl (meth)-acrylamide, N-isobutoxymethyl acrylamide, and N-t-octoxymethyl acrylamide, divinyl benzene, vinyl acetate, chloromethyl styrene, ureaformaldehyde resin, bis-oxazoline type compounds, epichlorohydrin, 1,3-dichloroisopropanol, and glycerin diglycidyl ether may be cited. They are popularly used as cross-linking agents.

Since the present invention is mainly aimed at utilizing the surface functional groups of the produced microsphere, it is required to enable the produced microsphere to acquire an increased bulk density and consequently manifest a high mechanical strength and a large density in contrast with the conventional porous particles which require the diameter of pores therein to be adjusted as by varying the amount of a cross-linking agent to be added in the process of polymerization. Thus, the amount of the cross-linking agent to be added is generally in the range of from 10 to 70% by weight, preferably from 15 to 60% by weight, and more preferably from 25 to 50% by weight, based on 100% by weight of the monomer mixture mentioned above containing the cross-linking agent. If this amount of addition is less than 10% by weight, the produced microsphere is at a disadvantage in being deficient in cross-linking degree, mechanical strength, thermal and chemical stability, ability to tolerate repeated treatments in an autoclave at an elevated temperature (110° to 120° C.), capacity for safe performance in a wide pH range, and stability to withstand various organic solvents and, therefore, being not fully suitable for use as a substrate for a filler in affinity chromatography. Conversely, if this amount exceeds 70% by weight, the amount of the cross-linking agent which remains in the microsphere after the polymerization is so large as to impair the economy of the production. Though the aforementioned problems which are attendant on the insufficient use of the cross-linking agent are no longer suffered, an undue increase in the cross-linking agent entails the problem that the microsphere, when used as an affinity adsorbent or a filler for affinity chromatography, will not manifest a capacity for adsorption as expected.

The peroxide type initiators and the azo type initiators which are effectively usable in this invention embrace all the same types of initiators which have been heretofore known to the art. As typical examples of the peroxide type initiators, benzoyl peroxide (BPO) and substitution products thereof, diacyl peroxides (RCOOOCOR), dialkyl peroxides (ROOR), ester peroxides (RCOOOR'), peroxy carbonate (ROCOOOCOOR), hydroperoxides (ROOH), and redox initiators obtained by combining these peroxides with a reducing substance may be cited. As typical examples of the azo initiators, N-nitroso-acylallyl amine, $\alpha,\alpha'$-azo-bis-isobutyronitrile (AIBN), azo-bis-esters [RR'(COOR")-CN-NC(COOR")RR'], azo-triphenyl methane [$C_6H_5N=NC(C_6H_5)_3$], diazoamino benzene ($C_6H_5N=NNHC_6H_5$), diazo-thioethers (RN=RSR'), tetramethyl tetrazene [$(CH_3)_2NN=NN(CH_3)_2$], diazo-methanes (RC=R=N], and sulfone azides $RSO_2N=N=N$ may be cited. In this invention, these initiators may be used in the form of a combination of two or more members.

The concentration at which the initiator is used in the polymerization is generally in the range of from $1\times10^{-5}$ to $8\times10^{-2}$ mol/liter, preferably from $0.5\times10^{-4}$ to $8\times10^{-2}$ mol/liter, and more preferably from $0.5\times10^{-3}$ to $8\times10^{-3}$ mol/liter, based on the volume of the mixed solution of monomer. If the concentration of the initiator deviates from the range, $1\times10^{-5}$ to $8\times10^{-2}$ mol/liter, the produced polymer is invariably at a disadvantage in assuming the form of non-globular coarse particles.

Then, in the polymerization of this invention, the mixed solution of monomer mentioned above is kept generally in a temperature range of 30° to 95° C., preferably 65° to 85° C., and more preferably 70° to 80° C., the initiator mentioned above is added thereto at a concentration in the range mentioned above, and the ensuing polymerization is carried out for a period generally in the range of from 2 to 15 hours, preferably from three to 10 hours, and more preferably from 3 to 7 hours.

If the temperature of the mixed solution of monomer during the process of polymerization is less than 30° C., the speed of dissolution of the initiator will be unduly low and the amount of a radical to be formed by the dissolution of the initiator will not be sufficient. Conversely, if this temperature exceeds 95° C., the amount of a radical to be formed by the dissolution of the initiator will be unduly large and the heat of polymerization reaction will grow and the safety of operation will be impaired. If the time of polymerization reaction is less than three hours, the produced polymer particles will not have fully undergone the process of formation and the yield of polymerization will be extremely low. Conversely, if this time exceeds seven hours, the excess of time will be only wasted because the polymerization reaction has been completed within the span of seven hours.

After the polymerization is completed, it is necessary that the radical polymerization reaction still in process be stopped as by suddenly lowering the reaction temperature with an ice bath. No particular restriction is imposed on such factors as the stirring force (number of revolutions), pressure, and atmosphere to be used during the polymerization. These factors may be suitably selected in due consideration of the numerical ranges mentioned above. Desirably, the polymerization is carried out in an atmosphere of inactive gas under normal pressure with the solution kept stirred at a rate in the range of from 50 to 5000 rpm to ensure uniform distribution of the temperature of the reaction system.

As remarked time and again herein before, this invention does not contemplate adding a dispersion stabilizer to the reaction system during the polymerization. Generally, a dispersion stabilizer has the advantage of enabling discrete polymer particles to be obtained under a wide range of polymerization conditions. If this dispersion stabilizer is used contrary to this invention, however, it will do more harm than good because the reaction solution obtained at the end of the polymerization is not sufficiently purified because of inevitable technical difficulty and the dispersion stabilizer persisting in the produced polymer, when this produced polymer is utilized for reactions associated with biology, exerts an adverse effect on the reactions as impurities. Thus, this invention dictates the necessity for avoiding the use of a dispersion stabilizer during the polymerization.

The produced microsphere can be readily purified by any of the standard methods heretofore known to the art because it does not contain such impurities as dispersion stabilizer. For example, the microsphere of this invention may be purified and obtained in the form of a xerogel by a such a method as employed in the examples cited hereinbelow which comprises the steps of centrifuging the reaction solution resulting from the polymerization by means of a centrifugal separator thereby separating the microsphere from the solution, the solvent (alcohol), or the reprecipitation solvent for polymer (purifying water and acetone), further separating and purifying the microsphere by decantation or filtration, and finally drying the separated microsphere as by vacuum desiccation. This invention does not need to limit the purification of the produced microsphere to the particular method just mentioned. It allows the purification to be implemented by any of the methods of purification heretofore known to the art.

The microsphere which is obtained by the method of production mentioned above is intended to utilize exclusively the surface functional group of the polymer beads instead of the functional group in the pores of the polymer beads. It is, therefore, desired to have the smallest possible particle diameter and consequently the largest possible surface area and the largest possible number of functional groups on the surface of the gel beads and, for the purpose of use as a filler in affinity chromatography, to fulfill additionally the requirement that the microsphere be in the form of globular particles of a uniform diameter. The microsphere, therefore, is required to have a hygroscopic coefficient generally in the range of from 10 to 400%, preferably from 50 to 300%, and more preferably from 100 to 250%. If the hygroscopic coefficient is less than 10%, the produced microsphere will be at a disadvantage in having undergone cross-linking to an excess degree and consequently acquiring extremely high density and manifesting hydrophobic characteristics conspicuously while acquiring ample mechanical strength. Conversely, if the hydroscopic coefficient exceeds 400%, the produced microsphere will be at a disadvantage in having undergone cross-linking to an unduly low degree and therefore manifesting no sufficient mechanical strength while acquiring a porous structure having a relatively large pore diameter. The "hygroscopic coefficient of microsphere" under consideration is defined to be a magnitude of (B−A)/A×100, wherein A and B are numerical values which are to be obtained by the following procedures. (1) A given dry microsphere is weighed. The weight thus found is reported as A. (2) This dry microsphere is left standing in a large excess of water for 24 hours. (3) The wet microsphere is centrifuged under the conditions of 10,000 rpm and 17,680 G for 20 minutes to expel excess water. (4) The microsphere containing the absorbed water and undergone the centrifugation is weighed. The weight thus found is reported as B. The steps (1) through (4) mentioned above are carried out invariably at 25° C. under one atmosphere.

The gellation ratio of the microsphere is generally in the range of from 40 to 98%, preferably from 50 to 90%, and more preferably from 70 to 85%. If the gelling ratio exceeds 98%, the produced microsphere will be at a disadvantage in having undergone cross-linking to an excessive degree and consequently assuming an extremely high density and manifesting hydrophobic characteristics conspicuously while acquiring sufficient mechanical strength. Conversely if this gelling ratio is less than 40%, the produced microsphere will be at a disadvantage in having undergone cross-linking to an insufficient degree and manifesting no sufficient mechanical strength while acquiring a porous structure having a relatively large pore diameter. The "gelling ratio of microsphere" under consideration is defined to be a magnitude of (B/A)×100, wherein A and B stand for the numerical values which are to be obtained by the following procedures. (1) In 100 ml of water, A g of a given microsphere is placed. (2) The polymer is left standing in water at 50° C. for 24 hours. (3) Then, the wet microsphere is centrifuged under the conditions of 10000 rpm and 17,680 G for 20 minutes to expel excess water. (4) The microsphere which has absorbed water and undergone the centrifugation is dehydrated and dried. (5) The dry microsphere consequently obtained is weighed and the weight thus found is reported as B g. The steps (1) and (3) to (5) are invariably carried out at 25° C. under one atmosphere.

The particle diameter of the microsphere is generally in the range of from 0.05 to 0.5 μm, preferably from 0.08 to 0.4 μm, and more preferably from 0.1 to 0.3 μm. Ideally, the particle diameter is preferable to be as small as permissible. The lower limit, 0.05 μm, equals the diameter of the cores of the minute particles which are formed during the initial stage of polymerization. Any decrease of the particle diameter below this lower limit, therefore, is inconceivable because it is difficult to form such extremely minute particles from the practical point of view. If the particle diameter exceeds 0.5 μm, the produced microsphere will be at a disadvantage in acquiring no sufficient surface area and containing surface functional groups only in an unduly small concentration.

From the description given above, it is plain that when a microsphere has hygroscopieity coefficient, gellation ratio, and particle diameter in the respective ranges mentioned above, it exhibits high mechanical strength, chemical stability to withstand solutions of various salts, surfactants, and guanidine hydrochloride which are used in ordinary affinity chromatography, and ability to function safely in a wide pH range (pH 2 to 10) and contains at a high concentration such advantageous functional groups as adapt the microsphere for an adsorbent of a high capacity for adsorption.

Now, this invention will be described more specifically below with reference to working examples.

EXAMPLE 1

In an atmosphere of nitrogen, 25 g of acrylamide and 20.5 g of N,N'-methylene bis-acryl amide as a cross-linking agent (the ratio of the cross-linking agent 45.1% by weight to 100% by weight of the monomer mixture including acrylamide and the cross-linking agent were stirred and dissolved in 1000 ml of ethanol while dissolved oxygen was thoroughly removed meanwhile. Then, the resultant monomer mixture kept at 70° C. and combined with 0.821 g of $\alpha,\alpha'$-azo-bis-isobutyronitrile as an initiator (initiator concentration $5\times10^{-3}$ mol/liter) was caused to polymerize at pH 6.5 for 3 hours. After the reaction was completed, the produced polymer still held in a polymerization vessel was suddenly cooled in an ice bath to stop the radical polymerization in process. Consequently, a microsphere was obtained in the form of minute discrete beads.

Then, the reaction solution was separated by a centrifugal separator into the produced microsphere of polyacrylamide and a supernatant. The microsphere was combined with 1000 ml of newly supplied alcohol, stirred vigorously for 1 hour, and thereafter subjected to centrifugal separation. This procedure was repeated a total of 3 times. The finally separated microsphere was separated by a glass filter and dried under a reduced pressure at 50° C.

The microsphere thus obtained was dissolved with purified water as a solvent to form an aqueous 5 wt % polymer solution. This aqueous polymer solution was combined with 20 times its quantity of acetone as a precipitating agent and they were thoroughly stirred together to induce reprecipitation. The resultant reaction solution was then centrifuged to separate the microsphere and a supernatant. This procedure was repeated once more. The finally separated microsphere was separated by a glass filter and then dried under a reduced pressure at 50° C. to complete purification.

The microsphere thus obtained had particle diameters distributed in a narrow range and an average particle diameter of 0.14 μm. The yield was 95.2%. The hygroscopic coefficient of the microsphere was 152% and the gellation ratio thereof 83%.

EXAMPLE 2

Polymerization and subsequent purification were carried out by following the procedure of Example 1 while changing the amount of N,N'-methylene bis-acrylamide from 20.5 g to 12.5 g (33.3% by weight based on 100% by weight of the monomer mixture including acrylamide and the cross-linking agent) and the temperature from 70° C. to 80° C.

The polyacrylamide consequently obtained was a microsphere in the form of discrete beads having particle diameters distributed in a narrow range and an average particle diameter of 0.18 μm. The yield was 101.8%. The hygroscopic coefficient of the microsphere was 187% and the gellation ratio thereof 72%.

EXAMPLE 3

Polymerization and subsequent purification were carried out by following the procedure of Example 1 while changing the amount of N,N'-methylene bis-acrylamide from 20.5 g to 12.5 g (33.3% by weight based on 100% by weight of the monomer mixture including acrylamide and the cross-linking agent) and the temperature from 70° C. to 60° C. and using 1,615 g of benzoyl peroxide ($5\times10^{-3}$ mol/liter) in the place of 0.821 g of α,α'-azo-bis-isobutyronitrile as an initiator.

The polyacrylamide consequently obtained was a microsphere in the form of discrete beads having particle diameters distributed in a narrow range and an average particle diameter of 0.21 μm. The yield was 94.0%. The hygroscopic coefficient of the microsphere was 205% and the gellation ratio thereof 70%.

EXAMPLE 4

Polymerization and subsequent purification were carried out by following the procedure of Example 1 while changing the amount of N,N'-methylene bis-acrylamide from 20.5 g to 12.5 g (33.3% by weight based on 100% by weight of the monomer mixture including acrylamide and the cross-linking agent) and the temperature from 70° C. to 60° C. and using 0.1614 g of benzoyl peroxide ($5\times10^{-4}$ mol/liter) in the place of 0.821 g of α,α'-azo-bis-isobutyronitrile as an initiator.

The polyacrylamide consequently obtained was a microsphere in the form of discrete beads having particle diameters distributed in a narrow range and an average particle diameter of 0.15 μm. The yield was 96.5%. The hygroscopic coefficient of the microsphere was 179% and the gellation ratio thereof 76%.

EXAMPLE 5

Polymerization and subsequent purification were carried out by following the procedure of Example 1 while using 1000 ml of methyl alcohol in the place of 1000 ml of ethyl alcohol and changing the amount of acrylamide from 25 g to 30 g and the amount of N,N'-methylene bis-acrylamide from 20.5 g to 24.5 g (45% by weight based on 100% by weight of the monomer mixture including acrylamide and the cross-linking agent).

The polyacrylamide consequently obtained was a microsphere in the form of discrete beads having particle diameters distributed in a narrow range and an average particle diameter of 0.17 μm. The yield was 95.5%. The hygroscopic coefficient of the microsphere was 161% and the gellation ratio thereof 82%.

EXAMPLE 6

Polymerization and subsequent purification were carried out by following the procedure of Example 1 while using 1000 ml of propyl alcohol in the place of 1000 ml of ethyl alcohol and changing the amount of acryl amide from 25 g to 30 g, the amount of N,N'-methylene bis-acrylamide from 20.5 g to 24.5 g (45% by weight based on 100% by weight of the monomer mixture including acrylamide and the cross-linking agent), and the temperature from 70° C. to 6° C.

The polyacrylamide consequently obtained was a microsphere in the form of discrete beads having particle diameters distributed in a narrow range and an average particle diameter of 0.13 μm. The yield was 98.3%. The hygroscopic coefficient of the microsphere was 163% and the gellation ratio thereof 80%.

EXAMPLE 7

Polymerization and subsequent purification were carried out by following the procedure of Example 1 while using 800 ml of ethyl alcohol +200 ml of $H_2O$ (20% by weight of $H_2O$ incorporated therein) in the place of 1000 ml of ethyl alcohol.

The polyacryl amide consequently obtained was a microsphere in the form of discrete beads having particle diameters distributed in a narrow range and an average particle diameter of 0.18 μm. The yield was 94.1%. The hygroscopic coefficient of the microsphere was 185% and the gellation ratio thereof 74%.

EXAMPLE 8

Polymerization and subsequent purification were carried out by following the procedure of Example 1 while using 750 ml of ethyl alcohol +250 ml of $H_2O$ (25% by weight of $H_2O$ incorporated therein) in the place of 1000 ml of ethyl alcohol.

The polyacrylamide consequently obtained was a microsphere in the form of discrete beads having particle diameters distributed in a narrow range and an average particle diameter of 0.18 μm. The yield was 96.9%. The hygroscopic coefficient of the microsphere was 172% and the gellation ratio thereof 86%.

EXAMPLE 9

Polymerization and subsequent purification were carried out by following the procedure of Example 1 while using 850 ml of ethyl alcohol +150 ml of $H_2O$ (15% by weight of $H_2O$ incorporated therein) in the place of 1000 ml of ethyl alcohol and changing the amount of N,N'-methylene bis-acryl amide from 20.5 g to 25 g (50% by weight based on 100% by weight of the monomer mixture including acrylamide and the cross-linking agent).

The polyacrylamide consequently obtained was a microsphere in the form of discrete beads having particle diameters distributed in a narrow range and an average particle diameter of 0.17 μm. The yield was 97.4%. The hygroscopic coefficient of the microsphere was 172% and the gellation ratio thereof 86%.

EXAMPLE 10

Polymerization and subsequent purification were carried out by following the procedure of Example 1 while using 850 ml of methyl alcohol +150 ml of $H_2O$ (15% by weight of $H_2O$ incorporated therein) in the place of 1000 ml of ethyl alcohol.

The polyacryl amide consequently obtained was a microsphere in the form of discrete beads having particle diameters distributed in a narrow range and an average particle diameter of 0.18 μm. The yield was 96.9%. The hygroscopic coefficient of the microsphere was 169% and the gellation ratio thereof 79%.

EXAMPLE 11

Polymerization and subsequent purification were carried out by following the procedure of Example 1 while using 900 ml of ethyl alcohol +100 ml of $H_2O$ (10% by weight of $H_2O$ incorporated therein) in the place of 1000 ml of ethyl alcohol.

The polyacrylamide consequently obtained was a microsphere in the form of discrete beads having particle diameters distributed in a narrow range and an average particle diameter of 0.15 μm. The yield was 93.3%. The hygroscopic coefficient of the microsphere was 172% and the gellation ratio thereof 75%.

Control 1

Polymerization and subsequent purification were carried out by following the procedure of Example 1 while changing the amount of N,N'-methylene bis-acrylamide from 20.5 g to 0.8 g (3.1% by weight based on 100% by weight of the monomer mixture including acrylamide and the cross-linking agent).

The polyacrylamide consequently obtained was not a microsphere in the form of discrete particles but a polymer in the form of non-globular coarse particles. Thus, it could not be subsequently tested for average particle diameter, yield, hygroscopic coefficient, or gellation ratio.

Control 2

Polymerization and subsequent purification were carried out by following the procedure of Example 1 while changing the amount of N,N'-methylene bis-acryl amide from 20.5 g to 58.5 g (70.1% by weight based on 100% by weight of acryl amide).

The polyacrylamide consequently obtained was not a microsphere in the form of discrete particles but a polymer in the form of non-globular coarse particles. Thus, it could not be subsequently tested for average particle diameter, yield, hygroscopic coefficient, or gellation ratio.

Control 3

Polymerization and subsequent purification were carried out by following the procedure of Example 1 while changing the amount of α,α'-azo-bis-isobutyronitrile from 0.821 g to 0.000821 g (concentration of initiator $5 \times 10^{-6}$ mol/liter).

The polyacryl amide gel actually obtained consequently was in an extremely small amount. Under the belief that the production of this polyacryl amide in a sufficient amount would require the polymerization to be continued for a long time, the experiment was discontinued.

Control 4

Polymerization and subsequent purification were carried out by following the procedure of Example 1 while changing the amount of α,α'-azo-bis-isobutyronitrile from 0.821 g to 82.105 g (concentration of initiator $5 \times 10^{-1}$ mol/liter).

The polyacrylamide consequently formed underwent aggregation and formed coarse gel lumps. The polymerization failed to produce a microsphere in the form of discrete particles. Thus, the polyacrylamide could not be subsequently tested for average particle diameter, yield, hygroscopic coefficient, or gellation ratio.

Control 5

Polymerization and subsequent purification were carried out by following the procedure of Example 1 while using 0.001615 g of benzoyl peroxide (initiator concentration $5 \times 10^{-6}$ mol/liter) in the place of 0.821 g of α,α'-azo-bis-isobutyronitrile.

The polyacrylamide consequently obtained was not a microsphere in the form of discrete particles but a polymer in the form of non-globular coarse particles. Thus, it could not be subsequently tested for average particle diameter, yield, hygroscopic coefficient, or gellation ratio.

Control 6

Polymerization and subsequent purification were carried out by following the procedure of Example 1 while using 161.4866 g of benzoyl peroxide (initiator concentration $5 \times 10^{-1}$ mol/liter) in the place of 0.821 g of α,α'-azo-bis-isobutyronitrile.

The polyacrylamide consequently formed underwent aggregation and formed coarse gel lumps. The polymerization failed to produce a microsphere in the form of discrete particles. Thus, the polyacrylamide could not be subsequently tested for average particle diameter, yield, hygroscopic coefficient, or gellation ratio.

Control 7

Polymerization and subsequent purification were carried out by following the procedure of Example 1 while changing the temperature of polymerization from 70° C. to 20° C.

Since the polyacrylamide actually obtained consequently was in an extremely small amount, the experiment was discontinued.

Control 8

Polymerization and subsequent purification were carried out by following the procedure of Example 1 while changing the temperature of polymerization from 70° C. to 25° C.

Since the polyacrylamide actually obtained consequently was in an extremely small amount, the experiment was discontinued.

Control 9

Polymerization and subsequent purification were carried out by following the procedure of Example 1 while using 600 ml of ethyl alcohol +400 ml of $H_2O$ (40% by weight of $H_2O$ incorporated) in the place of 1000 ml of ethyl alcohol.

The polyacrylamide consequently formed underwent aggregation and formed coarse gel lumps. The polymerization failed to produce a microsphere in the form of discrete particles. Thus, the polyacrylamide could not be subsequently tested for average particle diameter, yield, hygroscopic coefficient, or gellation ratio.

Control 10

Polymerization and subsequent purification were carried out by following the procedure of Example 1 while using 650 ml of ethyl alcohol +350 ml of $H_2O$ (35% by weight of $H_2O$ incorporated) in the place of 1000 ml of ethyl alcohol and 1.615 g of benzoyl peroxide ($5 \times 10^{-3}$ mol/liter) in the place of 0.821 g of α,α-azo-bis-isobutyronitrile.

The polyacryl amide consequently formed underwent aggregation and formed coarse gel lumps. The polymerization failed to produce a microsphere in the form of discrete particles. Thus, the polyacrylamide could not be subsequently tested for average particle diameter, yield, hygroscopic coefficient, or gellation ratio.

The main production conditions used in Examples 1 to 11 and Controls 1 to 10 and the properties of the microspheres obtained therein are shown in Table 1 and Table 2.

TABLE 1

| Example | Alcohol | Water/whole solvent not more than 30 wt % | Monomer | Cross-linking | agent 25–50 wt % | Initiator/monomer | Initiator $1 \times 10^5 - 8 \times 10^2$ | Polymerization temp/whole solvent (°C.) | Polymerization time hour | pH |
|---|---|---|---|---|---|---|---|---|---|---|
| Example 1 | EtOH | — | Aa | MBA | 45.1 | AIBN | $5 \times 10^{-3}$ | 70 | 3 | 6.5 |
| Example 2 | EtOH | — | Aa | MBA | 33.3 | AIBN | $5 \times 10^{-3}$ | 80 | 3 | 6.5 |
| Example 3 | EtOH | — | Aa | MBA | 33.3 | PBO | $5 \times 10^{-3}$ | 60 | 3 | 6.5 |
| Example 4 | EtOH | — | Aa | MBA | 33.3 | PBO | $5 \times 10^{-4}$ | 60 | 3 | 6.5 |

TABLE 1-continued

| Example | Alcohol | Water/whole solvent not more than 30 wt % | Monomer | Cross-linking | agent 25-50 wt % | Initiator/monomer | Initiator $1 \times 10^5 - 8 \times 10^2$ | Polymerization temp/whole solvent (°C.) | Polymerization time hour | pH |
|---|---|---|---|---|---|---|---|---|---|---|
| Example 5 | MeOH | — | Aa | MBA | 45.0 | AIBN | $5 \times 10^{-3}$ | 70 | 3 | 6.5 |
| Example 6 | PrOH | — | Aa | MBA | 45.0 | AIBN | $5 \times 10^{-3}$ | 60 | 3 | 6.5 |
| Example 7 | EtOH | 20 | Aa | MBA | 45.1 | AIBN | $5 \times 10^{-3}$ | 70 | 3 | 6.5 |
| Example 8 | EtOH | 25 | Aa | MBA | 45.1 | AIBN | $5 \times 10^{-3}$ | 70 | 3 | 6.5 |
| Example 9 | EtOH | 15 | Aa | MBA | 50.0 | AIBN | $5 \times 10^{-3}$ | 70 | 3 | 6.5 |
| Example 10 | MeOH | 15 | Aa | MBA | 45.1 | AIBN | $5 \times 10^{-3}$ | 70 | 3 | 6.5 |
| Example 11 | EtOH | 10 | Aa | MBA | 45.1 | AIBN | $5 \times 10^{-3}$ | 70 | 3 | 6.5 |
| Control 1 | EtOH | — | Aa | MBA | 3.1 | AIBN | $6 \times 10^{-3}$ | 70 | 3 | 6.5 |
| Control 2 | EtOH | — | Aa | MBA | 70.1 | AIBN | $5 \times 10^{-3}$ | 70 | 3 | 6.5 |
| Control 3 | EtOH | — | Aa | MBA | 45.1 | AIBN | $6 \times 10^{-6}$ | 70 | 3 | 6.5 |
| Control 4 | EtOH | — | Aa | MBA | 45.1 | AIBN | $6 \times 10^{-1}$ | 70 | 3 | 6.5 |
| Control 5 | EtOH | — | Aa | MBA | 45.1 | PBO | $5 \times 10^{-6}$ | 70 | 3 | 6.5 |
| Control 6 | EtOH | — | Aa | MBA | 45.1 | PBO | $5 \times 10^{-1}$ | 70 | 3 | 6.5 |
| Control 7 | EtOH | — | Aa | MBA | 45.1 | AIBN | $5 \times 10^{-3}$ | 20 | 3 | 6.5 |
| Control 8 | EtOH | — | Aa | MBA | 45.1 | AIBN | $5 \times 10^{-3}$ | 25 | 3 | 6.5 |
| Control 9 | EtOH | 40 | Aa | MBA | 45.1 | AIBN | $5 \times 10^{-3}$ | 70 | 3 | 6.5 |
| Control 10 | EtOH | 35 | Aa | MBA | 45.1 | PBO | $5 \times 10^{-3}$ | 70 | 3 | 6.5 |

Note: In the table, MeOH is methanol, EtOH is ethanol, PrOH is propanol, Aa is acryl-amide, MBA is N,N'-methylene bis-acrylamide, AIBN is α,α'-azo-bis-isobutyro- nitrile, and PBO is benzoyl peroxide.

TABLE 2

| Example | Polymer particle diameter 0.05–0.5 (μm) | Yield % | Hygroscopicity 10–400 (%) | Gellation ratio 40–98 (%) |
|---|---|---|---|---|
| Example 1 | 0.14 | 95.2 | 152 | 83 |
| Example 2 | 0.18 | 101.8 | 187 | 72 |
| Example 3 | 0.21 | 94.0 | 205 | 70 |
| Example 4 | 0.15 | 96.5 | 179 | 76 |
| Example 5 | 0.17 | 95.5 | 161 | 82 |
| Example 6 | 0.13 | 98.3 | 163 | 80 |
| Example 7 | 0.18 | 94.1 | 185 | 74 |
| Example 8 | 0.18 | 96.9 | 172 | 86 |
| Example 9 | 0.17 | 97.4 | 172 | 86 |
| Example 10 | 0.18 | 96.9 | 169 | 79 |
| Example 11 | 0.15 | 93.3 | 172 | 75 |
| Control 1 | — | — | — | — |
| Control 2 | — | — | — | — |
| Control 3 | — | — | — | — |
| Control 4 | — | — | — | — |
| Control 5 | — | — | — | — |
| Control 6 | — | — | — | — |
| Control 7 | — | — | — | — |
| Control 8 | — | — | — | — |
| Control 9 | — | — | — | — |
| Control 10 | — | — | — | — |

What is claimed is:

1. A method for the production of a microsphere comprising the steps of:

dissolving in an alcoholic solvent selected from the group consisting of monohydric alcohol in water, dihydric alcohol in water and trihydric alcohol in water, said water being in an amount of not more than 30% by weight based on 100% by weight of the whole amount of the alcoholic solvent a monomer mixture, said monomer mixture including an ethylenically unsaturated amide and 10 to 70% by weight of a cross-linking agent, based on 100% by weight of said monomer mixture including said ethylenically unsaturated amide and said cross-linking agent, thereby forming a mixed solution;

keeping said mixed solution at a temperature in the range of from 30° to 95° C.;

adding to said mixture at least one initiator selected from the group consisting of peroxide initiators and azo initiators under stirring, said initiator being added in an amount to provide a final concentration in the range of from $1 \times 10^{-5}$ to $8 \times 10^2$ mol/liter for inducing polymerization of said monomer mixture; and removing said alcoholic solvent from said monomer mixture to separate said microsphere from said monomer mixture.

2. The method according to claim 1, wherein said polymerization is carried out without addition of a dispersant.

3. The method according to claim 1, wherein the amount of said water is in the range of from 10 to 25% by weight based on 100% by weight of the total amount of the solvent.

4. The method according to claim 1, wherein said ethylenically unsaturated amide comprises at least one member selected from the group consisting of acrylamide, methacrylamide, diacetone acrylamide, and N-hydroxymethyl acrylamide.

5. The method according to claim 4, wherein said ethylenically unsaturated amide is acrylamide.

6. The method according to claim 1, wherein said monomer mixture including an ethylenically unsaturated amide includes a monomer having at least one group selected from the group consisting of a —OH group, —NH$_2$ group, and —SH group.

7. The method according to claim 6, wherein the content of said ethylenically unsaturated amide monomer in said monomer mixture including an ethylenically unsaturated amide is not less than 0.1 mol %.

8. The method according to claim 1, wherein the amount of said monomer mixture to be dissolved is in the range of from 0.1 to 70% by weight, based on the amount of said organic solvent.

9. The method according to claim 1, wherein said cross-linking agent is a compound having at least two unsaturated double bonds in the molecular unit thereof.

10. The method according to claim 1, wherein the amount of said cross-linking agent to be added is in the range of from 15 to 60% by weight based on 100% by weight of said monomer mixture including said ethylenically unsaturated amide and said cross-linking agent.

11. The method according to claim 1, wherein the concentration of said initiator is in the range of from $0.5 \times 10^{-4}$ to $5 \times 10^{-2}$ mol/liter of said mixed solution.

12. The method according to claim 1, wherein the polymerization temperature is in the range of from 65° to 85° C.

13. The method according to claim 1 wherein said monohydric alcohol is selected from the group consisting of methanol, ethanol, propanol, isopropanol, 1-butanol, 2-butanol, t-butyl alcohol, 1-hexanol, 2-hexanol, 3-hexanol.

14. The method according to claim 1 wherein said dihydric alcohol is selected from the group consisting of ethylene glycol, diethylene glycol, triethylene glycol, propylene glycol, dipropylene glycol, 1,3 butylene glycol, neo-pentyl glycol, pentamethylene glycol and hexamethylene glycol polyethylene glycol having a molecular weight in the range between 4000 and 6800.

15. The method according to claim 1 wherein said trihydric alcohol is glycerol.

16. A method according to claim 1, wherein the amount of said polymerization initiator is in the range of from $1 \times 10^{-5}$ to $8 \times 10^{-3}$ mol/liter.

17. The method according to claim 1 wherein said monohydric alcohol is selected from the group consisting of ethylene glycol monomethyl ether, ethylene glycol monoethyl ether, ethylene glycol monobutyl ether and ethylene glycol monoisobutyl ether.

18. The method according to claim 1 wherein said dihydric alcohol is selected from the group consisting of polyethylene glycol having a molecular weight in the range between 4000 and 6800.

* * * * *